United States Patent Office 3,682,683
Patented Aug. 8, 1972

3,682,683
TRANSFER MEDIUM AND PROCESS OF MAKING
Donald L. Elbert, Hugh T. Findlay, and William H. Horne, Lexington, Ky., assignors to International Business Machines Corporation, Armonk, N.Y.
No Drawing. Continuation-in-part of application Ser. No. 686,788, Nov. 30, 1967. This application Nov. 12, 1969, Ser. No. 876,122
Int. Cl. B41m 5/10
U.S. Cl. 117—36.1        9 Claims

ABSTRACT OF THE DISCLOSURE

A transfer medium suitable for use, for example, as a typewriter ribbon is formed by coating a mixture of ink and resin contained in a volatile organic solvent on a polymer film and heating to remove the solvent. The ink, comprising coloring material dispersed in a vehicle, the resin and the solvent are selected such that the ink is preferentially solubilized in the solvent. During the evaporation of the solvent, this results in the ink becoming concentrated at the evaporating surface to produce a transfer medium having an exposed, ink rich surface.

RELATED APPLICATION

This application is a continuation-in-part of our copending application Ser. No. 686,788, filed Nov. 30, 1967 now abandoned.

BACKGROUND OF THE INVENTION

Transfer media are known which consist of a spongeous layer of resin containing in its interstices, a noncompatible ink. The spongeous transfer layer is supported by a coating of plastic sealed to one side. Such a transfer medium is described in patent application Ser. No. 536,577, filed Mar. 9, 1966, by Hugh T. Findlay and Kenneth H. Froman and now Pat. 3,413,184. The transfer medium is prepared by a process in which the porous-ink containing matrix is coated on a temporary substrate from a solvent. When the solvent is evaporated, the ink concentrates at the surface of the temporary substrate. The temporary substrate is stripped from the matrix after a backing layer has been coated on the other side so that the ink rich surface of the matrix is exposed.

An improved spongeous transfer medium particularly useful in the production of carbon papers is described in patent application Ser. No. 502,402, filed Oct. 22, 1965, by Hugh T. Findlay and William H. Horne and now Pat. 3,413,183. The porous ink containing matrix has a resin crust in contact with the writing surface, the transfer medium being thin enough so that ink can be forced through the crust when the medium is struck on the opposite side. The porous matrix is formed by first coating a thin backing palyer of plastic on a temporary plastic substrate and then coating a second layer of resin and ink dispersed in a suitable solvent on top of the first layer. Upon evaporation of the solvent, a pure resin crust forms on the side opposite the temporary substrate. The temporary substrate is then removed to give the finished transfer medium.

While the transfer media described above give satisfactory results, they are relatively expensive to prepare and the possible combinations of materials used in their preparation are limited. For example, both types of transfer media require a method of manufacture using a temporary substrate which must be removed. Therefore, if a permanent backing layer is desired, it must be furnished in a separate operation. For example, in the preparation of the transfer layer described in Pat. 3,413,184, a backing layer is coated on the surface of the matrix layer and the substrate is stripped from the porous matrix in order to bring the ink rich portion of the matrix to the surface. This not only is expensive, but many resin and ink matrix systems are not suited to the application of a second coating of a resin dissolved in a solvent to form the permanent substrate. This is because contamination of the permanent backing layer will occur due to solvent attraction for the ink in the matrix layer. The contamination reduces the printing efficiency of the transfer medium by reducing the ink concentration in the transfer layer. Avoiding the problem limits the possible combinations of polymer and solvent systems which can be employed. Also, the choice of a permanent substrate material is limited to materials which are readily soluble in ordinary organic solvents. Many of the most suitable materials, when coated on the matrix layer have been found to have poor moisture resistance. The absorption of moisture from the atmosphere has been found to cause the transfer and feeding properties of these transfer media to deteriorate. For example, typewriter ribbons curl and jam the ribbon feeding mechanism and the ribbons bleed ink into the surface of the paper causing smearing.

The transfer medium of Pat. 3,413,183 requires the casting of a thin permanent support layer over a temporary substrate prior to applying the ink containing matrix layer. A very thin support layer is required in order to permit the ink to be forced through the resin crust by striking the back of the support layer and if the support layer is too thick then unsatisfactory ink transfer will result. The thin transfer medium, while being satisfactory in applications such as carbon paper, restricts its use for typewriter ribbons and other applications where a greater degree of mechanical strength is required. Many of the soluble polymeric materials suitable in casting the support layer also subject the media to the moisture sensitivity difficulties discussed above.

BRIEF SUMMARY OF THE INVENTION

A process has now been found by which a transfer medium can be prepared by an economical process which is not restricted as heretofore in its choice of resin, ink and solvent systems. There is no need to provide a permanent backing in a second operation but the transfer medium can be formed by casting the porous-ink containing matrix directly onto a permanent, moisture resistant substrate.

In accordance with this invention, there is provided a process for producing a transfer medium comprising coating on a substrate, a dispersion comprising ink and a resin contained in a volatile organic solvent, the ink being noncompatible with the resin and the solvent favoring ink solubility over resin solubility. The coating contained on the substrate is dried at temperatures between about 65° and about 150° F. to remove the solvent with the result that the ink becomes concentrated on the surface away from the substrate.

DETAILED DESCRIPTION

The ink and polymer coatings are cast on a thin substrate or support layer having sufficient strength to withstand the mechanical stresses to which they are subjected both during the preparation of the transfer medium and during its use. Suitable support layers include, for example, thin films formed by conventional casting or extrusion techniques such as polyethylene, polypropylene, polyurethane, polymethyl methacrylate, polysulfones, phenoxies, nylon, polycarbonates, cellophane, polyethylene glycol terephthalate, carbonizing tissue, etc. The thickness of the substrate film should be at least about 0.1 mil. The lower limit is set to provide sufficient strength for a given application. The upper limit is determined only by the fact that the substrate must be thin enough such that when pressure is applied to it, sufficient ink can be forced from the matrix onto the writing surface. Advantageously, films of from about 0.1 to about 3.0 mils in thickness are employed.

Coating resins suitable for forming the porous matrix include for example, alcohol soluble nylons, vinyl chloride-vinyl acetate copolymers, epoxy resins, polyethylene, polypropylene, polyvinyl alcohol, and polyvinyl acetate.

The inks comprise a mixture of coloring material dispersed in a vehicle. Particularly useful as coloring materials are non-bleeding compositions of, for example, carbon black and organic dyes, but any other conventional organic and inorganic dyes and pigments can be used including mixtures. Such materials are well known in the art.

Suitable ink vehicles include modified polyvinylpyrrolidone, fatty acid esters of polyethylene glycol, mineral oil, and naturally occurring mixtures of fatty acid esters, for example, vegetable oils such as rapeseed oil. Various combinations of coloring materials and vehicles can be employed in the ink mixture.

The ink and the coating resin must be incompatible, i.e. mutually insoluble, so that the resulting transfer layer will be a porous resin matrix with the ink contained in its pores.

Suitable volatile solvents are those which will solubilize or disperse the resin and ink without dissolving the substrate and which can be removed by moderate air circulation and by heating at temperatures of from about 65° to 150° F. which will not harm the substrate. These include, for example, lower aliphatic hydrocarbons and their halogenated derivatives such as methylene chloride, aromatic hydrocarbons such as xylene, lower aliphatic alcohols such as ethanol, isopropanol and mixtures of the above including mixtures containing water.

Advantageously an inert, finely divided filler is added to the coating mixture to add stiffness and limit ink release from the matrix. Suitable fillers include, for example, wood flour, diatomaceous earth, clay, boehmite clay, talc, glass fiber, alumina, carbon black, etc.

As previously stated, to achieve the novel result of the invention, it is necessary to select the ink vehicle, solvent, and porous matrix forming resin such that the ink vehicle is preferentially soluble in the solvent. When the solvent is evaporated, this will cause the ink to concentrate at the surface where the evaporation of the solvent is taking place.

The relative portions of the components of the coating mixture are not particularly critical although a higher solvent content will result in a higher concentration of ink at the surface. Typical compositions contain per part by weight of resin; 0 to 1 part by weight of filler, 1 to 5 parts by weight of ink and 5 to 40 parts by weight of solvent.

The order of mixing the coating solution is not particularly critical. Conveniently, a dispersion of the colorants in the vehicle is mixed with the resin contained in the solvent. The ink dispersion can be prepared by grinding on mill such as the 5-inch x 12-inch three roll dispersion mill manufactured by J. H. Day Company, Cincinnati, Ohio. In this device, an ink vehicle is poured onto the feed roll and exits from the take-off roll. For example, the mixture is first processed with two passes through the roll dispersion mill with the input roll at 50 lbs. per sq. inch pressure and the output roll at 100 lbs. per sq. inch pressure. The mixing of the ink mixture is then completed with several more passes during which the input roll is at 150 lbs. per sq. inch and the output roll is at 200 lbs. per sq. inch. This will result in the ink being permanently mixed and it will not settle over an indefinite period of time.

The coating composition is prepared, for example, by mixing the ink and the resin-filler-solvent mixture for a short time at room temperature in a Cowles dissolver.

The coating solution is coated onto the substrate by any conventional means. An apparatus which has been found to be particularly suitable is a reverse roll coating applicator, such as is described in Pat. 3,413,184. A trailing blade or Gardner ultra applicator can be used in place of the reverse roll applicator. The coating is applied in a thickness required to produce after the evaporation of the solvent, a dried porous matrix preferably between about .1 and 2.5 mil in thickness. The thickness of the wet film needed to produce the described dry thickness will vary from about 2 to 15 times the desired dry thickness depending upon the solids content of the coating mixture, but is generally about twice the thickness of the dried matrix. The coated substrate is then passed through a drying chamber or oven to expel the solvent. The coated substrate is then processed into a finished product by either cutting it into carbon paper or slitting into narrow widths for winding on spools to form typewriter ribbon assemblies.

The invention is further illustrated by, but is not intended to be limited by the following examples wherein parts are parts by weight unless otherwise indicated.

Example I.—A coating solution was prepared according to the following formula:

| Component: | Parts by weight |
|---|---|
| Resin: Vinyl acetate-vinyl chloride copolymer (Vinylite VYHH) | 1 |
| Ink: 25% by weight pigment (Bichrome Black) in vehicle of 75% by weight rapeseed oil | 1 |
| Solvent: methylene chloride | 30 |

The ink dispersion was obtained by the use of a 5-inch x 12-inch three roll dispersion mill by the process described above. The ink dispersion and the solvent containing the vinyl acetate-vinyl chloride copolymer, were mixed together to form the coating solution by mixing them in a Cowles dissolver for 5 minutes at room temperature. A 1.0 mil wet layer of coating solution was applied to a 0.75 mil film of polyethylene film using a reverse roll coater. The coated film was dried to give a porous matrix having thickness of about 0.5 mil by passing the coating film through a hot air oven at an air temperature of approximately 100° F. The coated, dried film gave heavy ink transfer from the outside surface when pressure was applied to the back of the substrate. When the substrate was stripped from a portion of the film and pressure applied to the outside surface, only very light transfer was obtained from the casting surface showing that the ink had concentrated at the exposed surface.

Example II.—In order to illustrate the importance of the correct choice of solvent, Example I was repeated except that the solvent was changed from 30 parts methylene chloride to 30 parts of ethyl acetate. The finished transfer medium produced faint ink transfer from the outside surface and heavy ink transfer from the casting surface showing that the ink had concentrated at the casting surface.

Example III.—A series of samples having the same composition except for the solvent were prepared using the following resin, filler, ink and ink vehicle formulation.

| Component: | Parts by weight |
|---|---|
| Resin: Alcohol soluble polyamide (Elvamide 8061 Du Pont) | 1.0 |
| Filler: Superfine wood flour | 1.0 |
| Ink: Composed of by weight: | 2.0 |

Colorants:
    35 parts Furnace Black (Regal 300R Cabot Corporation)
Vehicle:
    30 parts mixed octyl esters of fatty acids (Kronisol R9 FMC Corporation)
    35 parts modified polyvinylpyrrolidone (Ganex V216 General Aniline and Film Corporation).

The ink was prepared by milling the vehicles and colorant on a three roll roller mill until the particle size was 0 to 1 on the Hegmann Scale. The ink and the Superfine wood flour filler were then mixed together to form a stiff paste. Four solutions of the alcohol soluble polyamide resin matrix forming material were prepared using the solvent combinations shown in Table I below. The resin was added with stirring to the solvent contained in a vessel equipped with a reflux condenser and heated to about 175° F. After the resin was dissolved the ink and filler mixture was added to the vessel and stirring continued until a uniform dispersion of the insoluble material was obtained.

TABLE I

| | Solvent (parts by weight) | | | | |
|---|---|---|---|---|---|
| | Isopropanol | Ethanol | Methanol | Xylene | Water |
| III A | 10 | | | | |
| III B | 9.6 | | | | 0.4 |
| III C | 4.5 | | 4.5 | 1.0 | |
| III D | | 10 | | | |

Draw down samples of a thickness sufficient to give a 0.001 inch dry caliper were prepared on 1 mil Mylar substrate film. The drying conditions for the removal of the solvent in each case was room temperature i.e. approximately 75° F. for five minutes. Portions of each sample were cut to the shape of a typewriter ribbon and write samples were taken utilizing an IBM "Selectric" typewriter from both the exposed surface and also from the cast surface after stripping the Mylar substrate. The results of the print intensity obtained in each case are listed in Table II below.

TABLE II

| Print surface | III A | III B | III C | III D |
|---|---|---|---|---|
| Casting surface | No ink transfer | Very light ink transfer | Light ink transfer | Dark ink transfer. |
| Exposed surface | Medium ink transfer | Medium ink transfer | do | Light ink transfer. |

The samples A and B which were made in accordance with the process of the invention, in which the ink was more soluble in the solvent than the resin, gave good ink transfer from the exposed surface and either very light or no ink transfer at all from the casting surface. Good overstrike capacity was obtained, for example, Sample III B had an overstrike capacity of at least five overstrikes. In contrast, Sample III D prepared using a formula having similar solubility characteristics to those described in patent 3,413,184 gave very dark ink transfer from the casting surface but only light ink transfer from the exposed surface showing that the ink had concentrated at the casting surface. Example III C indicates a condition where the solubility of the ink and resin vehicle was approximately equal in which case the write samples were of approximately equal density and light in each case.

Example IV.—to illustrate the versatility of the invention the formula of Example III–B was coated on a variety of substrate films and applied as approximately a 2 mil wet coat to the following substrates using a reverse roll coater: 0.5 mil nylon, 1.5 mil polyethylene, 0.25 mil polyethylene glycol terephthalate (Mylar), 0.5 mil polypropylene, 0.75 mil cellophane, and 6½ lb. carbonizing tissue. The dry transfer media all gave heavy ink transfer from the exposed surface and only light ink transfer from the casting surface. The drying conditions were with circulating air at a temperature of approximately 65° F.

Where there is no known solution or solvent attack or the supporting film, the nature of the bonding of the matrix to the support material is not fully understood. However, we believe that the bond is due to surface tension of the liquid ink and Van der Waals forces as a result of intermolecular attractions between surfaces. We have also found that a strong transfer medium, such as nylon 6, 10 or nylon 6, 6 film, having improved resistance to moisture (in comparison to alcohol soluble nylon such as Elvamide 8061) and excellent overstrike capacity without delamination of the ink containing nylon matrix, can be produced by choosing a substrate solvent combination wherein the insoluble nylon 6, 10 or 6, 6 film is at least swelled or etched by the solvent. This is illustrated by coating the nylon ink matrix formula of Example III B above to a 0.5 mil nylon 6, 10 film substrate in place of the Mylar substrate. The transfer media so formed possesses excellent surface ink release, excellent overstrike capacity, improved physical stability (over alcohol soluble nylon) and cannot be delaminated.

By the foregoing process, the phenomenon heretofore observed in that a polymer rich outer layer was always formed at the exposed surface in preparing a transfer medium by a coating process has been reversed to provide instead an ink rich outer layer at the exposed surface. This has resulted in lower cost transfer media of higher quality and greater versatility than heretofore obtainable.

While the invention has been particularly shown and described with reference to preferred embodiments thereof, it will be understood by those skilled in the art that the foregoing and other changes in form and details may be made therein without departing from the spirit and scope of the invention.

We claim:

1. A process for preparing a transfer medium comprising coating on a substrate, a dispersion comprising a resin and a substantially non-volatile oil base ink dispersed in a volatile organic solvent, said ink being incompatible with said resin and being more soluble in said solvent than is said resin, and heating the coated substrate to evaporate said solvent and thereby form a porous, ink containing resin matrix layer on said substrate which has said ink concentrated toward the outer surface of said matrix layer.

2. The process of claim 1 wherein said dispersion includes a finely divided inert filler.

3. A process for preparing a moisture resistant transfer medium comprising coating on a polymer film, a dispersion comprising a resin and a substantially non-volatile oil base ink dispersed in a volatile organic solvent which is a solvent for said resin and a swelling agent for said polymer film, said ink being incompatible with said resin and being more soluble in said solvent than is said resin, and heating the coated film to evaporate said solvent and thereby form a porous-ink containing resin matrix layer firmly adhered to said polymer film, said ink being concentrated toward the outer surface of said matrix layer.

4. A transfer medium prepared in accordance with the process of claim 3.

5. A transfer medium prepared in accordance with the process of claim 1.

6. A process for preparing a transfer medium comprising coating on a polymer film having a thickness of at least about 0.1 mil, a dispersion comprising a resin and from about 1 to 5 parts by weight per part by weight of resin of a substantially non-volatile oil base ink dispersed in from about 5 to 40 parts by weight per part by weight of resin of a volatile organic solvent, said ink being incompatible with said resin and being more soluble in said solvent than is said resin, drying at 65° F. to 150° F. the coated substrate to evaporate said solvent and thereby form a porous, ink containing resin matrix layer on said substrate which has said ink concentrated toward the outer surface of said matrix layer.

7. The process of claim 6 wherein said dispersion includes up to about 1 part by weight per part by weight of resin of a finely divided inert filler.

8. A process for preparing a moisture resistant transfer medium comprising coating on an insoluble nylon film, a dispersion comprising a soluble nylon and a substantially non-volatile oil base ink dispersed in a volatile organic solvent which is a solvent for said soluble nylon and a swelling agent for said insoluble nylon film, said ink being incompatible with said soluble nylon and being more soluble in said solvent than is said soluble nylon, and heating the coated nylon film to evaporate said solvent and thereby form a porous, ink containing nylon matrix layer firmly adhered to said nylon film, said ink being concentrated toward the outer surface of said nylon matrix layer.

9. The process of claim 8 wherein said solvent is ethanol.

References Cited
UNITED STATES PATENTS

| | | | |
|---|---|---|---|
| 2,820,717 | 1/1958 | Newman et al. | 117—36.1 |
| 3,117,018 | 1/1964 | Strauss | 117—36.1 |
| 3,252,414 | 5/1966 | Newman | 117—36.1 |
| 3,336,150 | 8/1967 | Takahashi et al. | 117—36.1 |
| 3,418,148 | 12/1968 | Barz | 117—36.1 |

MURRAY KATZ, Primary Examiner

U.S. Cl. X.R.

117—155 UA; 260—41 C